United States Patent [19]

Hofman et al.

[11] 3,883,667

[45] May 13, 1975

[54] IMPROVING GOUDA CHEESE FLAVOR

[75] Inventors: Hendrik Jan Hofman; Dirk Sloot, both of Vlaardingen, Netherlands

[73] Assignee: Lever Bros. Company, New York, N.Y.

[22] Filed: June 21, 1973

[21] Appl. No.: 372,112

[30] Foreign Application Priority Data
June 21, 1972 United Kingdom............... 29052/72

[52] U.S. Cl. ............................................... 426/538
[51] Int. Cl. ............................................. A23l 1/26
[58] Field of Search ............. 426/65, 175, 188, 361

[56] References Cited
UNITED STATES PATENTS
2,065,183  12/1936  Harris ................................ 426/188
3,034,902  5/1962  Bavisotto ........................ 426/188 X
3,156,569  11/1964  Griffin .............................. 426/361 X

*Primary Examiner*—Joseph M. Golian
*Attorney, Agent, or Firm*—James J. Farrell, Esq.; Melvin H. Kurtz, Esq.; Arnold Grant, Esq.

[57] ABSTRACT

The cheese flavour of edible products is improved by the addition of calcium salts of unsubstituted mono- or di- $C_4$ to $C_8$ carboxylic acids. Especially the addition of calcium 2-methyl butanoate and/or calcium 3-methyl butanoate is useful to improve the old Gouda cheese flavour.

8 Claims, No Drawings

IMPROVING GOUDA CHEESE FLAVOR

The invention relates to a process for improving the cheese flavour of an edible product.

BACKGROUND OF THE INVENTION

The production of products in which a good cheese flavour is desired, is of considerable importance. Examples of such products include processed cheese, cheese snacks and cheese sauces. In the traditional method of preparing e.g. processed cheese, old cheese is added to give the product the required flavour, but the use of flavouring compositions to replace at least part of the old cheese has also been disclosed.

It has now been found that the addition of calcium salts of unsubstituted mono- or di- $C_4$ to $C_8$ carboxylic acids improves the cheese flavour, particularly the old Gouda cheese flavour of these products.

THE INVENTION

The invention therefore provides a process for improving the cheese flavour of an edible product by the addition of a calcium salt of an unsubstituted mono- or di- $C_4$ to $C_8$ carboxylic acid.

Of course the amount of the salt added to the edible product must be such as to give the required flavour to the product. The amount will vary depending on the type of edible product and indeed on the taste of the consumers for which the product is intended. But as a guide the amount should be such that the amount of calcium salt in the end product is between 1 and 5,000 ppm, preferably between 100 and 1,000 ppm.

The calcium salt should preferably be a mixture of salts. Calcium salts of $C_4$ and $C_5$ acids are preferred for the process according to the invention. Calcium salts of mono-acids can particularly advantageously be used.

Calcium salts of branched-chain acids, especially calcium 2-methyl butanoate and more especially calcium 3-methyl butanoate, have been found to be particularly useful for the process according to the invention.

The salt can be added at any suitable stage.

The invention will now be illustrated by the following Examples:

The following cheese flavoring composition were used in the Examples as illustrations of Gouda cheese flavouring compositions, which can be improved by incorporation of calcium salts.

|  | cheese flavoring composition 1 ppm* | cheese flavoring composition 2 ppm* |
| --- | --- | --- |
| butanoic acid | 400 | 40 |
| hexanoic acid | 80 | 40 |
| octanoic acid | 80 | 20 |
| decanoic acid | 60 | 10 |
| dodecanoic acid | 60 | 10 |
| tetradecanoic acid | 60 | — |
| methyl propyl ketone | 3 | 1.5 |
| methyl pentyl ketone | 3 | 1.5 |
| ethyl hexanoate | 1.5 | 0.75 |
| delta-dodecalactone | 20 | 10 |
| dimethylsulphide | 0.3 | 0.15 |
| diacetyl | 1.5 | 0.75 |
| methional | 0.3 | 0.15 |
| 4-cis heptenal | 0.003 | 0.001 |
| mono-sodium glutamate | 3000 | 3000 |
| methionine | 1000 | 1000 |
| L-lysine HCl | 2000 | 2000 |

*in the edible product

Comp. A

A processed cheese was prepared from young Gouda cheese and cheese flavoring composition 1.

EXAMPLE I

A processed cheese was prepared as Comp. A. During its preparation, however, an amount of calcium butanoate dissolved in water was added to give 300 ppm calcium butanoate in the processed cheese. The taste of the resulting product resembled the taste of old Gouda cheese more closely than Comp. A.

EXAMPLE II

Example I was repeated. Additionally, however, an amount of calcium 3-methyl butanoate was added to give 150 ppm calcium 3-methyl butanoate in the processed cheese. The taste of the resulting product resembled the taste of old Gouda cheese even more closely than Example I.

EXAMPLE III

A processed cheese was prepared as Comp. A. During its preparation, however, an amount of calcium succinate dissolved in water was added to give 500 ppm calcium succinate in the processed cheese. The taste of the resulting product resembled more closely than Comp. A the racy, slightly bitter taste of old Gouda cheese.

Comp. B

A processed cheese was prepared as in Comp. A with the exception, however, that no cheese flavoring composition was used.

EXAMPLE IV

A processed cheese was prepared as Comp. B. During its preparation, however, amounts of calcium butanoate, calcium 3-methyl butanoate and calcium succinate were added to give 300 ppm calcium butanoate, 150 ppm calcium 3-methyl butanoate and 500 ppm calcium succinate in the processed cheese. The taste of the resulting product resembled the taste of old Gouda cheese more closely than Comp. B.

Comp. C

A processed cheese was prepared from equal parts of old and young Gouda cheese without any cheese flavoring composition being added.

EXAMPLE V

A processed cheese was prepared as Comp. C. During its preparation, however, an amount of calcium butanoate was added to give 300 ppm calcium butanoate in the processed cheese. The taste of the resulting product more closely resembled the taste of old Gouda cheese than Comp. C.

Comp. D

A cheese sauce was prepared from flour, young Gouda cheese, common salt, water and cheese flavoring composition 2.

EXAMPLE VI

A cheese sauce was prepared as Comp. D. Amounts of calcium butanoate and calcium 3-methyl butanoate, however, were dissolved in the water to give 300 ppm calcium butanoate and 150 ppm calcium 3-methyl butanoate in the cheese sauce. The taste of the resulting product more closely resembled the taste of old Gouda cheese than Comp. D.

EXAMPLE VII

A cheese sauce was prepared as Comp. D. An amount of calcium succinate, however, was added to give 500 ppm calcium succinate in the cheese sauce. The taste of the resulting product more closely resembled the racy taste of heated, old Gouda cheese.

What is claimed is:

1. A process for improving the old Gouda cheese flavor of an edible Gouda flavored product lacking in old Gouda cheese flavor, in which a calcium salt of an unsubstituted mono- or di- $C_4$ to $C_8$ carboxylic acid is added to the edible Gouda flavored product to give between 1 and 5,000 ppm of the salt in said edible product.

2. A process as claimed in claim 1, in which the calcium salt added is the calcium salt of a $C_4$ acid.

3. A process as claimed in claim 1, in which the calcium salt added is the calcium salt of a $C_5$ acid.

4. A process as claimed in claim 1, in which the calcium salt added is the calcium salt of a mono-acid.

5. A process as claimed in claim 1, in which the calcium salt added is the calcium salt of a branched-chain acid.

6. A process as claimed in claim 1, in which the calcium salt added is calcium 2-methyl butanoate.

7. A process as claimed in claim 1, in which the calcium salt added is calcium 3-methyl butanoate.

8. A process as claimed in claim 1, in which the amount of the calcium salt is added to the edible product to give between 100 and 1,000 ppm of the salt in the edible product.

* * * * *